US 8,988,510 B2

United States Patent
Min et al.

(10) Patent No.: US 8,988,510 B2
(45) Date of Patent: Mar. 24, 2015

(54) 3D IMAGE DISPLAY DEVICE

(75) Inventors: Byungsam Min, Yangju-si (KR); Kiduk Kim, Paju-si (KR); Sunhwa Lee, Paju-si (KR); Jinwoo Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 541 days.

(21) Appl. No.: 12/879,709

(22) Filed: Sep. 10, 2010

(65) Prior Publication Data
US 2011/0149047 A1 Jun. 23, 2011

(30) Foreign Application Priority Data

Dec. 17, 2009 (KR) ........................ 10-2009-0126233

(51) Int. Cl.
| | |
|---|---|
| H04N 13/04 | (2006.01) |
| G02B 27/22 | (2006.01) |
| G09G 3/00 | (2006.01) |
| G09G 3/36 | (2006.01) |
| G09G 3/34 | (2006.01) |

(52) U.S. Cl.
CPC ............ *G02B 27/2264* (2013.01); *G09G 3/003* (2013.01); *G09G 3/3406* (2013.01); *G09G 3/3666* (2013.01); *G09G 2320/064* (2013.01); *H04N 13/0438* (2013.01); *H04N 13/0497* (2013.01)
USPC ..................................... 348/51; 348/E13.074

(58) Field of Classification Search
CPC ....................................................... G02B 27/22
USPC ................... 348/E13.031, E13.032, E13.042, 348/E13.044, E13.045, E13.029; 359/462, 359/464, 472
See application file for complete search history.

(56) References Cited

U.S. PATENT DOCUMENTS

| | | | | |
|---|---|---|---|---|
| 8,217,996 | B2 * | 7/2012 | Kane et al. ....................... | 348/55 |
| 2006/0050384 | A1 * | 3/2006 | Agostinelli ................... | 359/462 |
| 2006/0238863 | A1 * | 10/2006 | Saishu ........................ | 359/472 |

(Continued)

FOREIGN PATENT DOCUMENTS

| | | |
|---|---|---|
| CN | 1766708 | 5/2006 |
| CN | 1955793 A | 5/2007 |

(Continued)

OTHER PUBLICATIONS

Liou et al. "Shutter glasses stereo LCD with a dynamic backlight", Proc. SPIE 7237, Stereoscopic Displays and Applications XX, 72370X, Feb. 17, 2009.*

(Continued)

*Primary Examiner* — Jay Patel
*Assistant Examiner* — Frank Huang
(74) *Attorney, Agent, or Firm* — Brinks Gilson & Lione

(57) ABSTRACT

A three-dimensional (3D) image display device includes a liquid crystal display panel alternately displaying a left eye image and a right eye image every unit frame period, a data driving circuit, a gate driving circuit, a timing controller that divides the unit frame period into first and second sub-frame periods, repeatedly supply the same frame data to the data driving circuit during the first and second sub-frame periods, and control operations of the data and gate driving circuits using a frame frequency higher than an input frame frequency, backlight light sources generating light to be provided to the liquid crystal display panel, and a light source driving circuit that sequentially turns on the backlight light sources when liquid crystals of the liquid crystal display panel are kept in a saturation state.

14 Claims, 9 Drawing Sheets

(56) References Cited

U.S. PATENT DOCUMENTS

2007/0152951 A1* 7/2007 Ahn .............................. 345/102
2008/0042953 A1* 2/2008 De Haan et al. ................ 345/89

FOREIGN PATENT DOCUMENTS

| CN | 101599251 A | | 12/2009 |
|----|-------------|---|---------|
| JP | 2003050569 A | | 2/2003 |
| JP | 20070295322 A | | 11/2007 |
| JP | 2009025436 A | * | 2/2009 |
| WO | WO 2007072599 A1 | | 6/2007 |
| WO | WO 2008/068695 A1 | | 6/2008 |

OTHER PUBLICATIONS

Machine translation JP 2009025436 A.*
Office Action issued in corresponding Chinese Patent Application No. 201010262653.9, mailed May 16, 2012.
Office Action issued in corresponding Japanese Patent Application No. 2010-155349 mailed Aug. 14, 2012.
Office Action issued in corresponding Chinese Patent Application No. 201010262653.9, mailed Feb. 5, 2013.

* cited by examiner

3D IMAGE DISPLAY DEVICE

This application claims the benefit of Korea Patent Application No. 10-2009-0126233, filed on Dec. 17, 2009, the entire contents of which is incorporated herein by reference for all purposes as if fully set forth herein.

BACKGROUND

1. Field of the Invention

Exemplary embodiments of the invention relate to a three-dimensional (3D) image display device capable of improving the display quality by reducing a response time of liquid crystals.

2. Discussion of the Related Art

An image display device displays a three-dimensional (3D) image using a stereoscopic technique or an autostereoscopic technique.

The stereoscopic technique, which uses a parallax image of left and right eyes of a user with a high stereoscopic effect, includes a glasses method and a non-glasses method which have been put to practical use. In the non-glasses method, an optical plate, such as a parallax barrier, for separating optical axes of left and right parallax images is generally installed in front of or behind a display screen. In the glasses method, left and right parallax images each having a different polarization direction are displayed on a liquid crystal display panel, and a 3D image is displayed using polarization glasses or liquid crystal shutter glasses.

The glasses method may be mainly classified into a first polarization filter method using a patterned retarder film and polarization glasses, a second polarization filter method using a switching liquid crystal layer and polarization glasses, and a shutter glasses method using liquid crystal shutter glasses.

In the first polarization filter method, a left eye image and a right eye image are alternately displayed on the liquid crystal display panel every horizontal line, and polarization characteristics of light incident on the polarization glasses are converted by the patterned retarder film on the liquid crystal display panel. Through this operation, the first polarization filter method implements a 3D image by spatially dividing the left eye image and the right eye image. In the second polarization filter method, the left eye image and the right eye image are alternately displayed on the liquid crystal display panel every frame period, and polarization characteristics of light incident on the polarization glasses are converted by the switching liquid crystal layer on the liquid crystal display panel. Through this operation, the second polarization filter method implements the 3D image by dividing the left eye image and the right eye image. In the first and second polarization filter methods, a transmittance of the 3D image is reduced because of the patterned retarder film and the switching liquid crystal layer serving as a polarization filter.

In the shutter glasses method, the left eye image and the right eye image are alternately displayed on the liquid crystal display panel every frame period, and left and right eye shutters of the liquid crystal shutter glasses are opened and closed in synchronization with a display timing of the left and right eye images. Hence, the shutter glass method implements the 3D image. As shown in FIG. 1, the liquid crystal shutter glasses are controlled, so that only its left eye shutter is opened during a first frame period in which the left eye image (for example, a white image W) is displayed on the liquid crystal display, panel, and only its right eye shutter is opened during a second frame period in which the right eye image (for example, a black image B) is displayed on the liquid crystal display panel. Hence, a 3D image is produced in a time-division manner.

A backlight unit is turned on during a second period Tb of each of the first and second frame periods so as to satisfy required specifications shown in FIG. 1, thereby achieving good stereoscopic characteristics. For this, a response of the liquid crystals has to be completed during a first period Ta of each of the first and second frame periods. However, a response of real liquid crystals is not completed within the first period Ta and extends to the second period Tb. Hence, a luminance of the white image W is low and a luminance of the black image B is high because of an increase in a response time of the liquid crystals. In other words, when the backlight unit is turned on during the second period Tb, the backlight unit is turned on before the liquid crystals of the white image W reach a rising saturated state. Hence, the white image W with a luminance level lower than a desired luminance level is displayed. Further, because the backlight unit is turned on before the liquid crystals of the black image B reach a falling saturated state, the black image B with a luminance level higher than a desired luminance level is displayed. As described above, when the backlight unit is turned on during a period where the liquid crystals of the white image or the black image are not completely saturated, a ghost type 3D crosstalk is generated.

BRIEF SUMMARY

Exemplary embodiments of the invention provide a three-dimensional (3D) image display device capable of improving the display quality by reducing a response time of liquid crystals.

In one aspect, there is a 3D image display device comprising a liquid crystal display panel configured to alternately display a left eye image and a right eye image every unit frame period, a data driving circuit configured to drive data lines of the liquid crystal display panel, a gate driving circuit configured to drive gate lines of the liquid crystal display panel, a timing controller configured to divide the unit frame period into first and second sub-frame periods, repeatedly supply the same frame data to the data driving circuit during the first and second sub-frame periods of the unit frame period, and control operations of the data driving circuit and the gate driving circuit using a frame frequency higher than an input frame frequency, backlight light sources configured to generate light to be provided to the liquid crystal display panel, and a light source driving circuit configured to sequentially turn on the backlight light sources when liquid crystals of the liquid crystal display panel are kept in a saturation state.

In another aspect, there is a 3D image display device comprising a liquid crystal display panel configured to alternately display a left eye image and a right eye image every unit frame period, the liquid crystal display panel being divided into first and second display surfaces, a first data driving circuit configured to drive data lines of the first display surface, a second data driving circuit configured to drive data lines of the second display surface, a gate driving circuit configured to sequentially supply a gate pulse for scanning the first display surface to gate lines of the first display surface and sequentially supply a gate pulse for scanning the second display surface to gate lines of the second display surface, a timing controller configured to divide the unit frame period into first and second sub-frame periods, repeatedly supply the same frame data to each of the first and second data driving circuits during the first and second sub-frame periods of the unit frame period, and control operations of the first and second data driving circuits and the gate driving circuit using a frame frequency higher than an input frame frequency, backlight light sources configured to generate light to be provided to the liquid crystal display panel, and a light source driving circuit configured to turn off the backlight light sources during the first sub-frame period and simultaneously turn on the backlight light sources within the second sub-frame period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Reference will now be made in detail to embodiments of the invention, examples of which are illustrated in the accompanying drawings.

Figure 1:
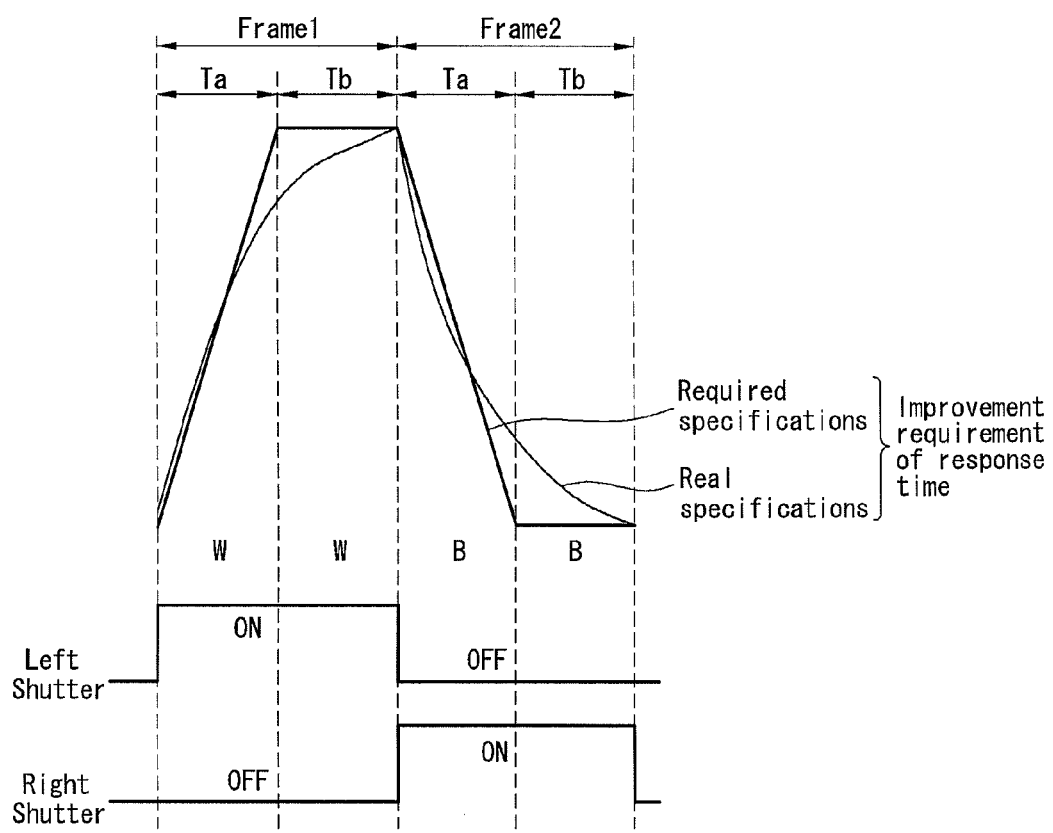
FIG. 1 illustrates a reason why a three-dimensional (3D) crosstalk occurs because of an increase in a response time of liquid crystals in a related art 3D image display device.
Figure 2:
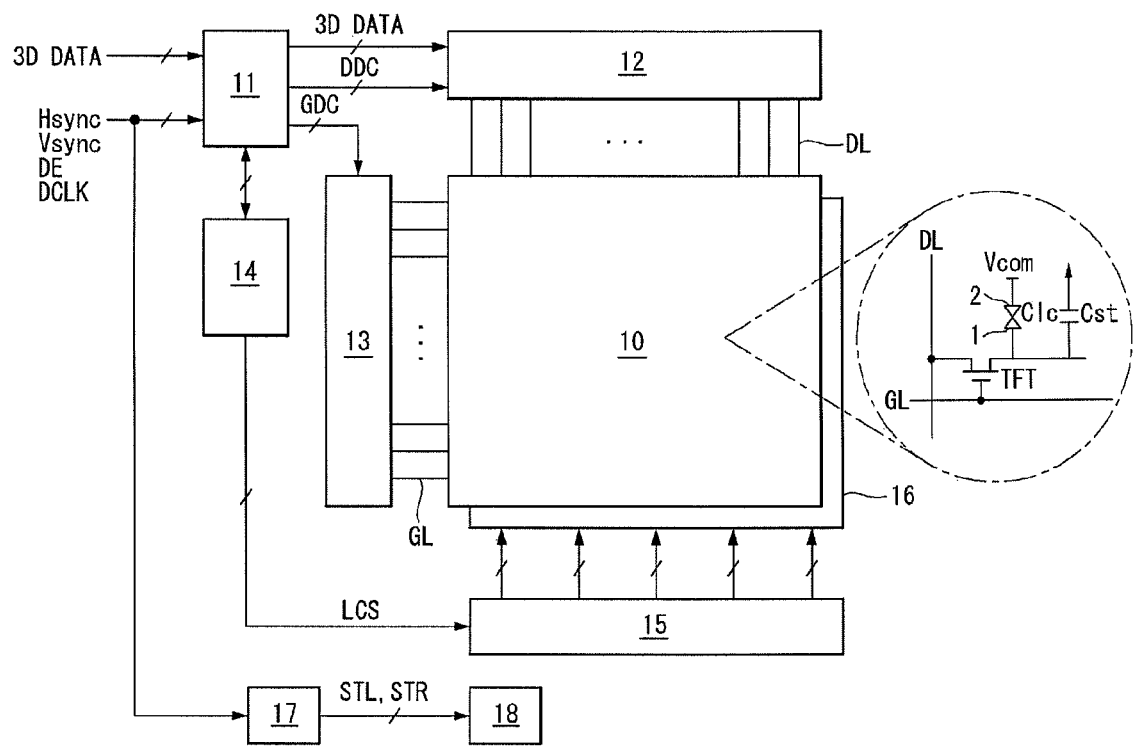
FIG. 2 illustrates a 3D image display device according to an exemplary embodiment of the invention.

FIG. 2 illustrates a three-dimensional (3D) image display device according to an exemplary embodiment of the invention. As shown in FIG. 2, a 3D image display device according to an exemplary embodiment of the invention includes a liquid crystal display panel 10, a timing controller 11, a data driving circuit 12, a gate driving circuit 13, a light source control circuit 14, a light source driving circuit 15, a backlight unit 16, a shutter control circuit 17, and shutter glasses 18.

The liquid crystal display panel 10 includes an upper glass substrate (not shown), a lower glass substrate (not shown), and a liquid crystal layer (not shown) between the upper and lower glass substrates. A plurality of data lines DL and a plurality of gate lines GL cross one another on the lower glass substrate of the liquid crystal display panel 10. A plurality of liquid crystal cells Clc are arranged on the liquid crystal display panel 10 in a matrix form in accordance with the data lines DL and the gate lines GL crossing each other. Thin film transistors TFT, pixel electrodes 1 of the liquid crystal cells Clc connected to the thin film transistors TFT, storage capacitors Cst are formed on the lower glass substrate of the liquid crystal display panel 10.

A black matrix (not shown), a color filter (not shown), and a common electrode 2 are formed on the upper glass substrate of the liquid crystal display panel 10. The common electrode 2 may be formed on the upper glass substrate in a vertical electric field driving manner, such as a twisted nematic (TN) mode and a vertical alignment (VA) mode. The common electrode 2 and the pixel electrode 1 may be formed on the lower glass substrate in a horizontal electric field driving manner, such as an in-plane switching (IPS) mode and a fringe field switching (FFS) mode. Polarizing plates (not shown) are respectively attached to the upper and lower glass substrates of the liquid crystal display panel 10. Alignment layers (not shown) for setting a pre-tilt angle of liquid crystals are respectively formed the inner surfaces of the upper and lower glass substrates contacting the liquid crystals.

The timing controller 11 generates a data timing control signal DDC and a gate timing control signal GDC for respectively controlling operation timings of the data driving circuit 12 and the gate driving circuit 13 based on timing signals Vsync, Hsync, DE, and DCLK received from an external system board. The timing controller 11 multiplies the frequency of the data timing control signal DDC by the frequency of the gate timing control signal GDC and controls operations of the data driving circuit 12 and the gate driving circuit 13 using a frame frequency of (input frame frequency× N), where N is a positive integer equal to or greater than 2. In particular, N is the number of sub-frame periods. For example, the frame frequency is 240 Hz when the input frame frequency is 120 Hz and N is 2. An external system circuit may perform a multiplication operation of the frame frequency.

The timing controller 11 time-divides a unit frame period into a first sub-frame period and a second sub-frame period. The timing controller 11 copies digital video data 3D DATA of a 3D data format received from the external system circuit using a frame memory. The timing controller 11 repeatedly supplies data (hereinafter, referred to as "left eye data") displayed when a left eye shutter of the shutter glasses 18 is opened to the data driving circuit 12 during first and second sub-frame periods of an odd-numbered unit frame period. Further, the timing controller 11 repeatedly supplies data (hereinafter, referred to as "right eye data") displayed when a right eye shutter of the shutter glasses 18 is opened to the data driving circuit 12 during first and second sub-frame periods of an even-numbered unit frame period.

The data driving circuit 12 includes a plurality of data driver integrated circuits (ICs). Each of the data driver ICs includes a shift register for sampling a clock, a register for temporarily storing the digital video data 3D DATA received from the timing controller 11, a latch that stores data corresponding to one line in response to the clock received from the shift register and simultaneously outputs the data each corresponding to one line, a digital-to-analog converter for selecting a positive or negative gamma voltage based on a gamma reference voltage corresponding to the digital video data received from the latch, a multiplexer for selecting the data line DL receiving analog data converted from the positive/ negative gamma voltage, an output buffer connected between the multiplexer and the data lines DL, and the like. The data driving circuit 12 converts the left and right eye data of the 3D data format into an analog data voltage based on the data timing control signal DDC synchronized with the frame frequency of (input frame frequency×N) and supplies twice the same data to the data lines DL during each unit frame period.

The gate driving circuit 13 includes a plurality of gate driver ICs. Each of the gate driver ICs includes a shift register, a level shifter for converting an output signal of the shift register into a swing width suitable for a TFT drive of the liquid crystal cells, an output buffer, and the like. The gate driving circuit 13 sequentially outputs a scan pulse (or a gate pulse) based on the gate timing control signal GDC synchronized with the frame frequency of (input frame frequency×N) and supplies twice the scan pulse to the gate lines GL during each unit frame period.

The backlight unit 16 includes a plurality of light sources and provides light to the liquid crystal display panel 10. The backlight unit 16 may be one of a direct type backlight unit and an edge type backlight unit. In the direct type backlight unit 16, a plurality of optical sheets and a diffusion plate are stacked under the liquid crystal display panel 10, and the plurality of light sources are positioned under the diffusion plate. In the edge type backlight unit 16, a plurality of optical sheets and a light guide plate are stacked under the liquid crystal display panel 10, and the plurality of light sources are positioned at the side of the light guide plate. The light sources may be a line light source such as a cold cathode fluorescent lamp (CCFL) and an external electrode fluorescent lamp (EEFL) or a point light source such as a light emitting diode (LED).

The light source control circuit 14 generates a light source control signal LCS under the control of the timing controller 11. The light source control circuit 14 controls the light sources using a pulse width modulation (PWM) signal in response to the light source control signal LCS so that the light sources are sequentially driven along a data scanning direction of the liquid crystal display panel 10. A maximum duty ratio of the PWM signal may be previously set within a range equal to or less than 50%, so that motion picture response time (MPRT) performance can be improved. The light source control circuit 14 may adjust a duty ratio of the PWM signal within the preciously set range of the maximum duty ratio based on the result of an analysis of the input data 3D DATA. The light source control circuit 14 controls the light source driving circuit 15 and may control an operation of the light sources using a preciously set driving current. A level of the driving current may be previously set to be inversely proportional to the maximum duty ratio of the PWM signal. More specifically, as the maximum duty ratio of the PWM signal decreases, the level of the driving current increases. The inversely proportional relationship between the maximum duty ratio of the PWM signal and the level of the driving current is to compensate for a reduction in a luminance of the screen resulting from an increase in a turn-off time of the light sources in the unit frame period so as to improve the MPRT performance. The light source control circuit 14 may be mounted inside the timing controller 11.

The light source control signal LCS includes a turn-on time and a turn-off time of the light sources. The turn-on time of the light sources is determined to be after the liquid crystals of a display surface of the liquid crystal display panel 10 corresponding to the light sources become saturated. The turn-on time of the light sources determined to be after the liquid crystals become saturated may be proportional to the duty ratio of the PWM signal.

The light source driving circuit 15 sequentially drives the light sources in synchronization with a data scanning operation of the liquid crystal display panel 10 in response to the light source control signal LCS. The light source driving circuit 15 generates the driving current determined based on the maximum duty ratio of the PWM signal under the control of the light source control circuit 14 and applies the driving current to the light sources.

The shutter control circuit 17 decides whether a current unit frame period is an odd-numbered unit frame period in which the left eye data will be displayed or an even-numbered unit frame period in which the right eye data will be displayed based on the vertical sync signal Vsync received from the external system circuit. The shutter control circuit 17 generates a left eye shutter control signal STL for opening the left eye shutter of the shutter glasses 18 during the odd-numbered frame period and generates a right eye shutter control signal STR for opening the right eye shutter of the shutter glasses 18 during the even-numbered frame period.

The shutter glasses 18 are a device that a viewer wears so that the viewer stereoscopically views the left/right eye image displayed on the liquid crystal display panel 10. The left eye shutter and the right eye shutter of the shutter glasses 18 are alternately opened and closed every unit frame period in synchronization with the left and right eye shutter control signals STL and STR generated by the shutter control circuit 17. Because the left and right eye images are alternately block, different images are respectively displayed on a left eye glass and a right eye glass of the shutter glasses 18. Hence, the viewer may feel a stereoscopic feeling.

Figure 3:
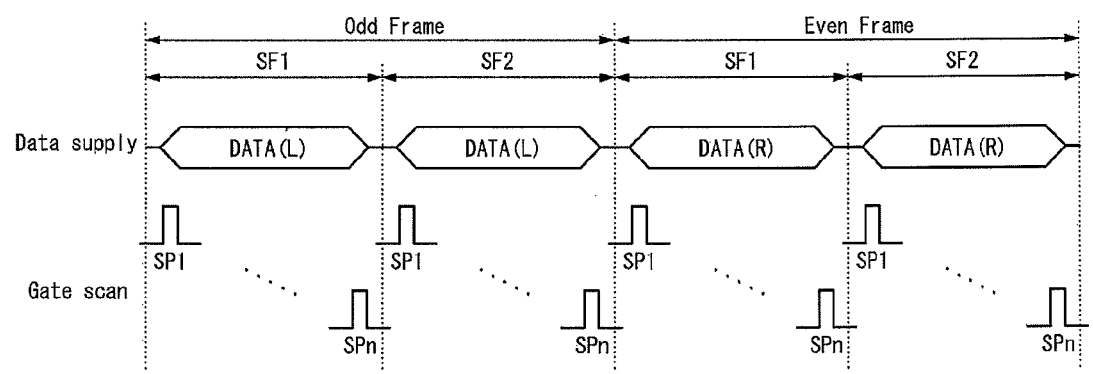
FIG. 3 illustrates a data entry time.
Figure 4:
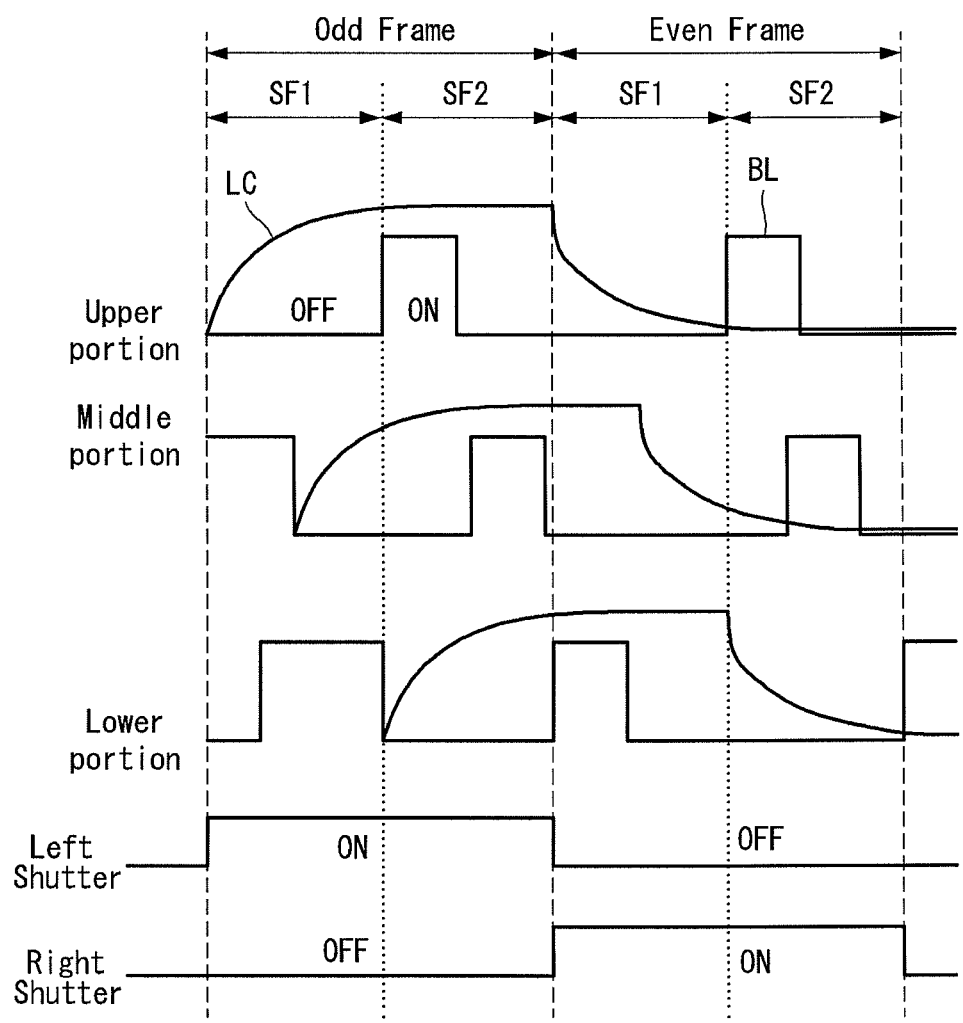
FIG. 4 illustrates a turn-on time and a turn-off time of light sources and an open time of left and right eye shutters.
Figure 5:
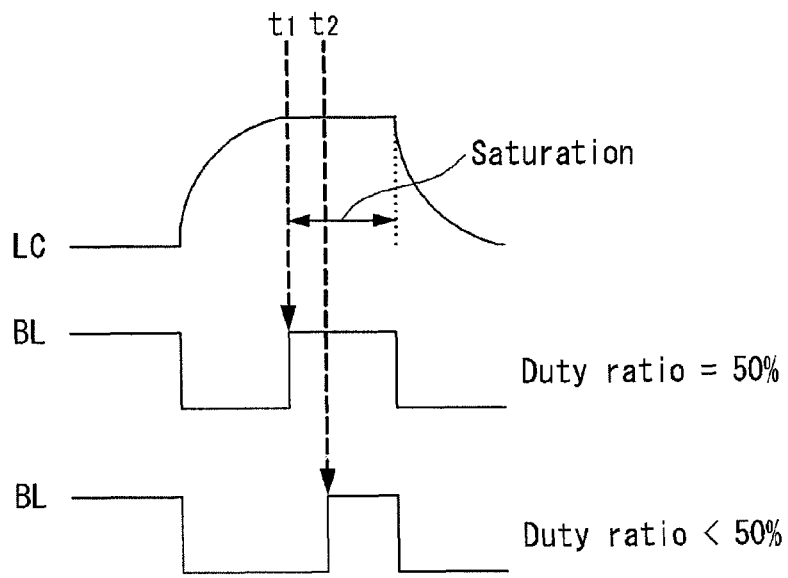
FIG. 5 illustrates variations of a turn-on time of light sources depending on a maximum duty ratio of a pulse width modulation (PWM) signal.

FIGS. 3 to 5 illustrate a data entry time, the turn-on time and the turn-off time of the light sources, and an open time of the left and right eye shutters of the shutter glasses 18 so as to improve the display quality.

As shown in FIGS. 3 and 4, the exemplary embodiment of the invention controls the driving circuits using the frame frequency of (input frame frequency×N) and time-divides the unit frame period into a first sub-frame period SF1 and a second sub-frame period SF2. During first and second sub-frame periods SF1 and SF2 of an odd-numbered frame period, the same left eye data DATA(L) is repeatedly displayed on the liquid crystal display panel 10. During first and second sub-frame periods SF1 and SF2 of an even-numbered frame period, the same right eye data DATA(R) is repeatedly displayed on the liquid crystal display panel 10. A response time of the liquid crystals LC greatly depends on a capacitor component existing in the liquid crystal display panel 10. Because the capacitor component is inversely proportional to the frame frequency, the response time of the liquid crystals LC decreases when the frame frequency of (input frame frequency×2) is used. As a result, the liquid crystals LC at each position (i.e., in the upper, middle, and lower portions) of the liquid crystal display panel 10 are saturated from immediately after the left eye data DATA(L) is written during the odd-numbered frame period to before the lapse of time corresponding to the first sub-frame period SF1. The liquid crystals LC are then kept in a saturation state during a period of time corresponding to the second sub-frame period SF2. The light sources BL are sequentially turned on at the duty ratio equal to or less than 50% during the period of time corresponding to the second sub-frame period SF2 in the odd-numbered frame period when the liquid crystals LC at each position are kept in the saturation state. During the odd-numbered frame period, the left eye shutter is open, and the right eye shutter is closed.

Further, the liquid crystals LC at each position (i.e., in the upper, middle, and lower portions) of the liquid crystal display panel 10 are saturated from immediately after the right eye data DATA(R) is written during the even-numbered frame period to before the lapse of time corresponding to the first sub-frame period SF1. The liquid crystals LC are then kept in a saturation state during a period of time corresponding to the second sub-frame period SF2. The light sources BL are sequentially turned on at the duty ratio equal to or less than 50% during the period of time corresponding to the second sub-frame period SF2 in the even-numbered frame period when the liquid crystals LC at each position are kept in the saturation state. During the even-numbered frame period, the right eye shutter is open, and the left eye shutter is closed.

As shown in FIG. 5, the turn-on time of the light sources BL may vary depending on the maximum duty ratio of the PWM signal. For example, the turn-on time of the light sources BL may be determined to be a first time point t1 so as to achieve a maximum duty ratio of 50% and may be determined to be a second time point t2 later than the first time point t1 so as to achieve a maximum duty ratio smaller than 50%.

Figure 6:
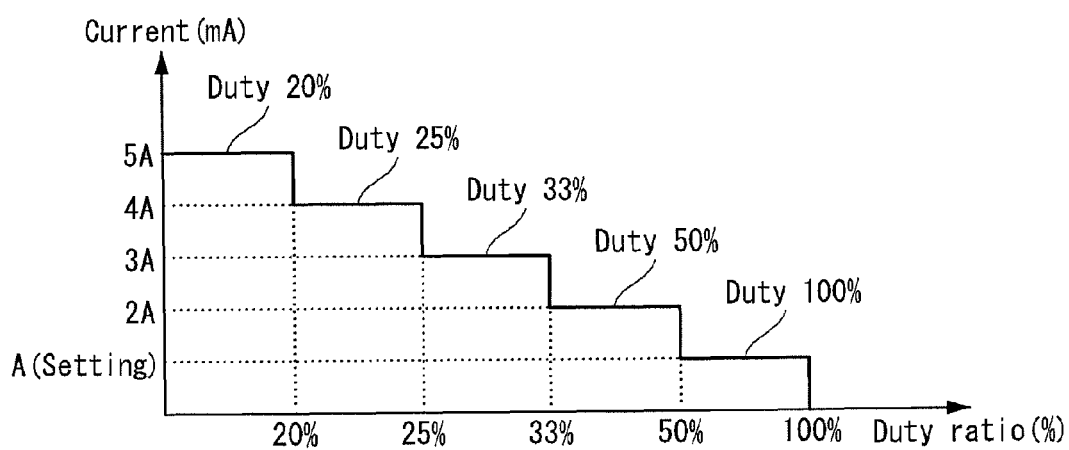
FIG. 6 illustrates variations of levels of a driving current depending on a maximum duty ratio of a PWM signal so as to compensate for a luminance reduction in a backlight scanning drive.

FIG. 6 illustrates variations of levels of the driving current depending on the maximum duty ratio of the PWM signal so as to compensate for a luminance reduction in a backlight scanning drive.

As shown in FIG. 6, a level of the driving current is inversely proportional to the maximum duty ratio of the PWM signal. For example, when a reference current level A is defined to be the current level when the maximum duty ratio of the PWM is 100%, the level of the driving current may be set at a value (i.e., 2A) corresponding to two times the reference current level A when the maximum duty ratio of the PWM signal is 50%; a value (i.e., 3A) corresponding to three times the reference current level A when the maximum duty ratio of the PWM signal is 33%; a value (i.e., 4A) corresponding to four times the reference current level A when the maximum duty ratio of the PWM signal is 25%; and a value (i.e., 5A) corresponding to five times the reference current level A when the maximum duty ratio of the PWM signal is 20%. In FIG. 6, the reference current level A, which is the current level corresponding to 100% maximum duty ratio of the PWM signal, is previously stored in a specific register of the light source control circuit 14.

Figure 7:
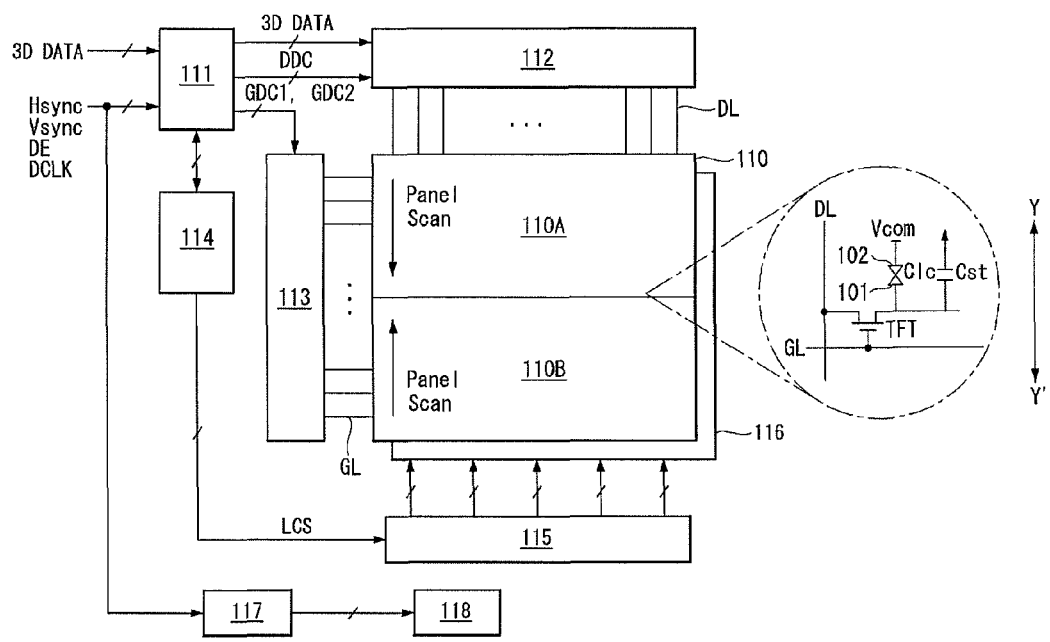
FIG. 7 illustrates a 3D image display device according to another exemplary embodiment of the invention.

FIG. 7 illustrates a 3D image display device according to another exemplary embodiment of the invention. As shown in FIG. 7, a 3D image display device according to another exemplary embodiment of the invention includes a liquid crystal display panel 110, a timing controller 111, a data driving circuit 112, a gate driving circuit 113, a light source control circuit 114, a light source driving circuit 115, a backlight unit 116, a shutter control circuit 117, and shutter glasses 118.

The liquid crystal display panel 110 includes an upper glass substrate (not shown), a lower glass substrate (not shown), and a liquid crystal layer (not shown) between the upper and lower glass substrates. A plurality of data lines DL and a plurality of gate lines GL cross one another on the lower glass substrate of the liquid crystal display panel 110. A plurality of liquid crystal cells Clc are arranged on the liquid crystal display panel 110 in a matrix form in accordance with the data lines DL and the gate lines GL crossing each other. Thin film transistors TFT, pixel electrodes 101 of the liquid crystal cells Clc connected to the thin film transistors TFT, storage capacitors Cst are formed on the lower glass substrate of the liquid crystal display panel 110. The liquid crystal display panel 110 is divided into a first display surface 110A and a second display surface 110B along a vertical direction.

A black matrix (not shown), a color filter (not shown), and a common electrode 102 are formed on the upper glass substrate of the liquid crystal display panel 110. The common electrode 102 may be formed on the upper glass substrate in a vertical electric field driving manner, such as a twisted nematic (TN) mode and a vertical alignment (VA) mode. The common electrode 102 and the pixel electrode 101 may be formed on the lower glass substrate in a horizontal electric field driving manner, such as an in-plane switching (IPS) mode and a fringe field switching (FFS) mode. Polarizing plates (not shown) are respectively attached to the upper and lower glass substrates of the liquid crystal display panel 110. Alignment layers (not shown) for setting a pre-tilt angle of liquid crystals are respectively formed the inner surfaces of the upper and lower glass substrates contacting the liquid crystals.

The timing controller 111 generates timing control signals DDC, GDC1, and GDC2 for controlling operation timings of the data driving circuit 112 and the gate driving circuit 113 based on timing signals Vsync, Hsync, DE, and DCLK received from an external system board. The timing controller 111 multiplies the frequency of the data timing control signal DDC by the frequency of the gate timing control signals GDC1 and GDC2 and controls operations of the data driving circuit 112 and the gate driving circuit 113 using a frame frequency of (input frame frequency×N), where N is a positive integer equal to or greater than 2. In particular, N is the number of sub-frame periods. For example, the frame frequency is 240 Hz when the input frame frequency is 120 Hz and N is 2. An external system circuit may perform a multiplication operation of the frame frequency.

The timing controller 111 time-divides a unit frame period into a first sub-frame period and a second sub-frame period. The timing controller 111 copies digital video data 3D DATA of a 3D data format received from the external system circuit using a frame memory. The timing controller 111 repeatedly supplies data (hereinafter, referred to as "left eye data") displayed when a left eye shutter of the shutter glasses 118 is opened to the data driving circuit 112 during first and second sub-frame periods of an odd-numbered unit frame period. Further, the timing controller 111 repeatedly supplies data (hereinafter, referred to as "right eye data") displayed when a right eye shutter of the shutter glasses 118 is opened to the data driving circuit 112 during first and second sub-frame periods of an even-numbered unit frame period.

Figure 8:
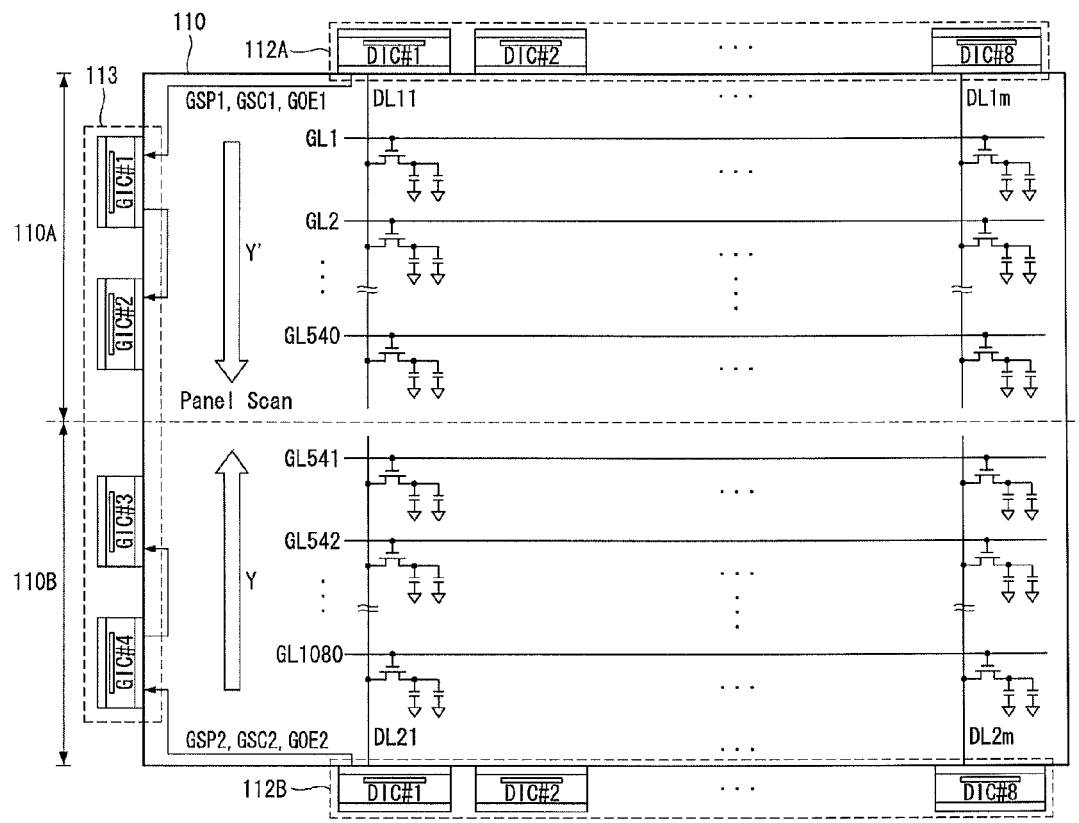
FIG. 8 illustrates driving circuits and a liquid crystal display panel.

As shown in FIG. 8, the data driving circuit 112 includes a first data driving circuit 112A for driving data lines DL11 to DL1m of the first display surface 110A and a second data driving circuit 112B for driving data lines DL21 to DL2m of the second display surface 110B. The data lines DL11 to DL1m of the first display surface 110A are electrically separated from the data lines DL21 to DL2m of the second display surface 110B by a boundary between the first and second display surfaces 110A and 110B.

Each of the first and second data driving circuits 112A and 112B includes a plurality of data driver ICs DIC#1 to DIC#8. Each of the data driver ICs DIC#1 to DIC#8 includes a shift register for sampling a clock, a register for temporarily storing the digital video data 3D DATA received from the timing controller 111, a latch that stores data corresponding to one line in response to the clock received from the shift register and simultaneously outputs each data corresponding to one line, a digital-to-analog converter that selects a positive or negative gamma voltage based on a gamma reference voltage corresponding to digital data received from the latch and generates a positive or negative data voltage using the positive/negative gamma voltage, a multiplexer for selecting the data line receiving the positive/negative data voltage, an output buffer connected between the multiplexer and the data lines, and the like.

The first data driving circuit 112A converts the left/right eye data of the 3D data format into an analog data voltage based on the data timing control signal DDC synchronized with the frame frequency of (input frame frequency×N) and repeatedly supplies the same data to the data lines DL11 to DL1m of the first display surface 110A during the unit frame period. The second data driving circuit 112B converts the left/right eye data of the 3D data format into an analog data voltage based on the data timing control signal DDC synchronized with the frame frequency of (input frame frequency×N)

and repeatedly supplies the same data to the data lines DL21 to DL2m of the second display surface 110B during the unit frame period.

The gate driving circuit 113 includes a plurality of gate driver ICs GIC#1 to GIC#4. Each of the gate driver ICs GIC#1 to GIC#4 includes a shift register, a level shifter for converting an output signal of the shift register into a swing width suitable for a TFT drive of the liquid crystal cells, an output buffer, and the like. The first and second gate driver ICs GIC#1 and GIC#2 performing a scanning operation on the first display surface 110A sequentially supply a gate pulse (or a scan pulse) to gate lines GL1 to GL540 of the first display surface 110A along the Y' direction shown in FIG. 8 based on the first gate timing control signal GDC1 synchronized with the frame frequency of (input frame frequency×N). The third and fourth gate driver ICs GIC#3 and GIC#4 performing a scanning operation on the second display surface 110B sequentially supply a gate pulse to gate lines GL541 to GL1080 of the second display surface 110B along the Y direction shown in FIG. 8 based on the second gate timing control signal GDC2 synchronized with the frame frequency of (input frame frequency×N).

The scanning operation of the first display surface 110A and the scanning operation of the second display surface 110B are simultaneously performed in a direction facing each other. The data voltage, that is supplied to the data lines DL11 to DL1m of the first display surface 110A in synchronization with the scanning operation of the first display surface 110A, is applied to the liquid crystal cells of the first display surface 110A. Further, the data voltage, that is supplied to the data lines DL21 to DL2m of the second display surface 110B in synchronization with the scanning operation of the second display surface 110B, is applied to the liquid crystal cells of the second display surface 110B.

The backlight unit 116 includes a plurality of light sources and provides light to the liquid crystal display panel 110. The backlight unit 116 may be one of a direct type backlight unit and an edge type backlight unit. In the direct type backlight unit 116, a plurality of optical sheets and a diffusion plate are stacked under the liquid crystal display panel 110, and the plurality of light sources are positioned under the diffusion plate. In the edge type backlight unit 116, a plurality of optical sheets and a light guide plate are stacked under the liquid crystal display panel 110, and the plurality of light sources are positioned at the side of the light guide plate. The light sources may be a line light source such as a cold cathode fluorescent lamp (CCFL) and an external electrode fluorescent lamp (EEFL) or a point light source such as a light emitting diode (LED).

The light source control circuit 114 generates a light source control signal LCS under the control of the timing controller 111. The light source control circuit 114 controls the light sources using a PWM signal in response to the light source control signal LCS so that the light sources are simultaneously driven in a blinking manner. A maximum duty ratio of the PWM signal may be previously set within a range equal to or less than 50%, so that MPRT performance can be improved. The light source control circuit 114 may adjust a duty ratio of the PWM signal within the preciously set range of the maximum duty ratio based on the result of an analysis of the input data 3D DATA. The light source control circuit 114 controls the light source driving circuit 115 and may control an operation of the light sources using a preciously set driving current. A level of the driving current may be previously set to be inversely proportional to the maximum duty ratio of the PWM signal. More specifically, as the maximum duty ratio of the PWM signal decreases, the level of the driving current increases. The inversely proportional relationship between the maximum duty ratio of the PWM signal and the level of the driving current is to compensate for a reduction in a luminance of the screen resulting from an increase in a turn-off time of the light sources in the unit frame period so as to improve the MPRT performance. The light source control circuit 114 may be mounted inside the timing controller 111.

The light source control signal LCS includes a turn-on time and a turn-off time of the light sources. The turn-on time of the light sources is determined to be after the liquid crystals in a middle portion of the first display surface 110A and a middle portion of the second display surface 110B become saturated in response to data charged to the middle portions of the first and second display surfaces 110A and 110B, so as to minimize light interference. The turn-on time of the light sources may be proportional to the duty ratio of the PWM signal after the liquid crystals are saturated.

The light source driving circuit 115 turns off all of the light sources during the first sub-frame period and turns on all of the light sources during the second sub-frame period in response to the light source control signal LCS, thereby driving the light sources in the blinking manner. The light source driving circuit 115 generates the driving current determined based on the maximum duty ratio of the PWM signal under the control of the light source control circuit 114 and applies the driving current to the light sources.

The shutter control circuit 117 decides whether a current unit frame period is an odd-numbered unit frame period in which the left eye data will be displayed or an even-numbered unit frame period in which the right eye data will be displayed based on the vertical sync signal Vsync received from the system circuit. The shutter control circuit 117 generates a left eye shutter control signal STL for opening the left eye shutter of the shutter glasses 118 during the odd-numbered frame period and generates a right eye shutter control signal STR for opening the right eye shutter of the shutter glasses 118 during the even-numbered frame period.

The shutter glasses 118 are a device that a viewer wears so that the viewer stereoscopically views the left/right eye image displayed on the liquid crystal display panel 110. The left eye shutter and the right eye shutter of the shutter glasses 118 are alternately opened and closed every unit frame period in synchronization with the left and right eye shutter control signals STL and STR generated by the shutter control circuit 117. Because the left and right eye images are alternately block, different images are respectively displayed on a left eye glass and a right eye glass of the shutter glasses 118. Hence, the viewer may feel a stereoscopic feeling.

Figure 9:
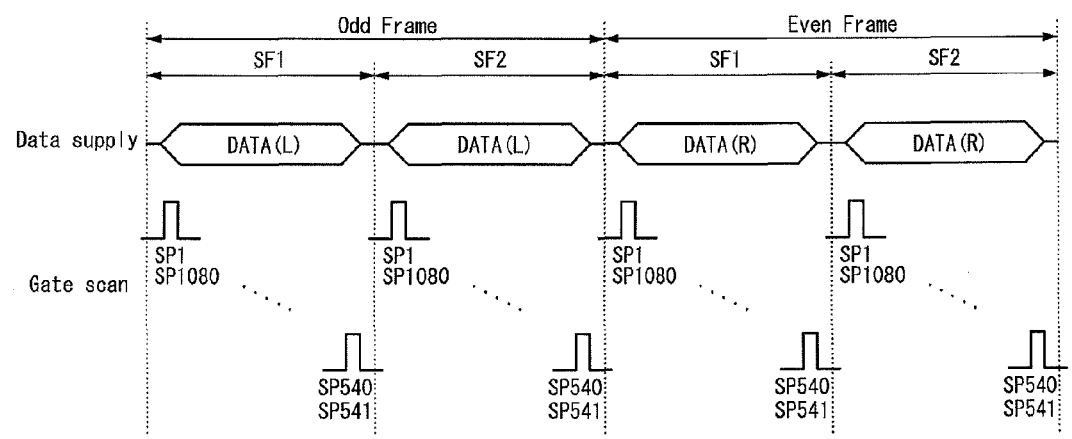
FIG. 9 illustrates a data entry time.
Figure 10:
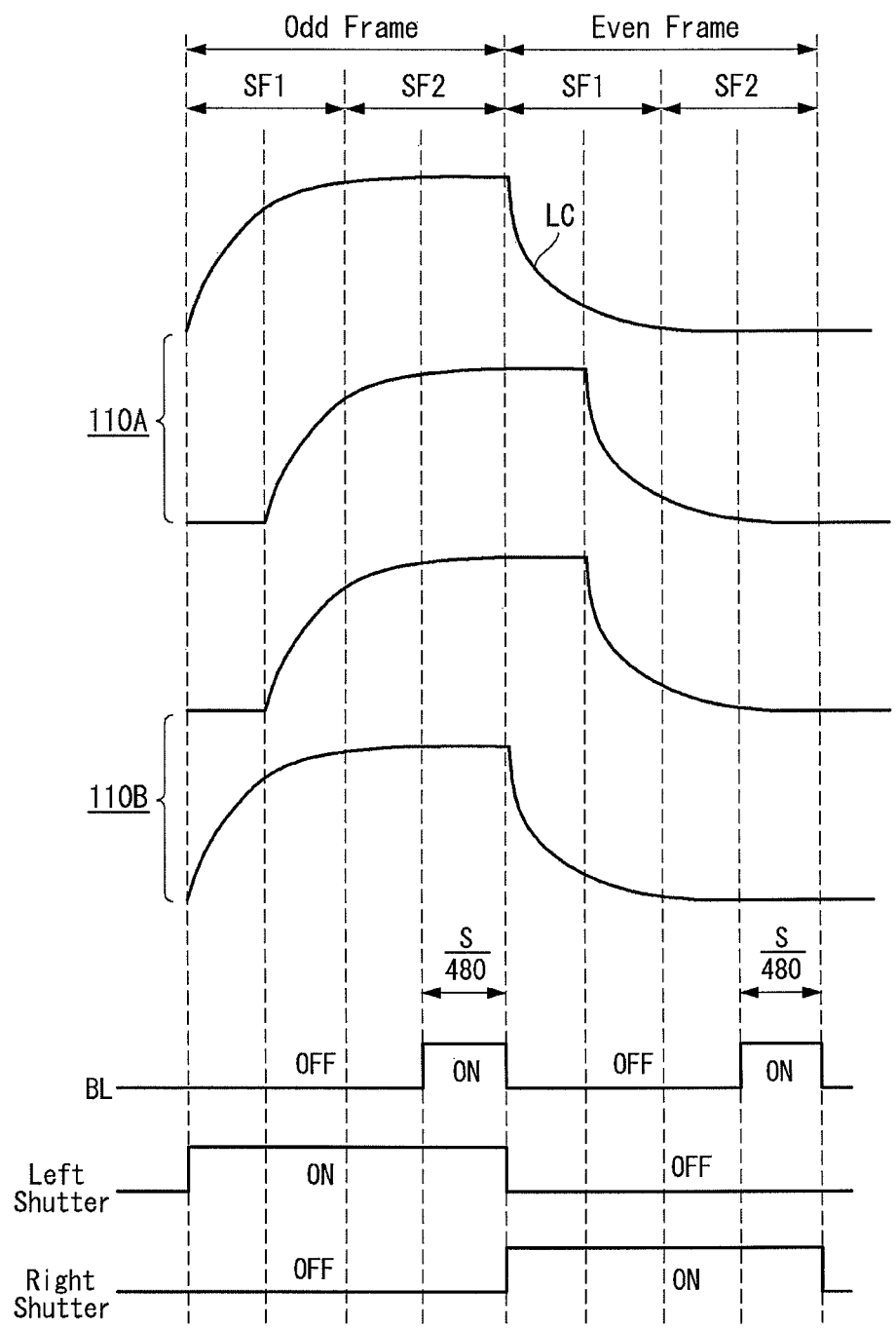
FIG. 10 illustrates a turn-on time and a turn-off time of light sources and an open time of left and right eye shutters.

FIGS. 9 and 10 illustrate a data entry time, the turn-on time and the turn-off time of the light sources, and an open time of the left and right eye shutters of the shutter glasses 118 so as to improve the display quality.

As shown in FIGS. 9 and 10, the exemplary embodiment of the invention controls the driving circuits using the frame frequency of (input frame frequency×N) and time-divides the unit frame period into a first sub-frame period SF1 and a second sub-frame period SF2. During first and second sub-frame periods SF1 and SF2 of an odd-numbered frame period, the same left eye data DATA(L) is repeatedly displayed on the liquid crystal display panel 10. During first and second sub-frame periods SF1 and SF2 of an even-numbered frame period, the same right eye data DATA(R) is repeatedly displayed on the liquid crystal display panel 10. A response time of the liquid crystals LC greatly depends on a capacitor component existing in the liquid crystal display panel 10 and a gate scanning time. Because the capacitor component is inversely proportional to the frame frequency, the response time of the liquid crystals LC decreases when the frame frequency of (input frame frequency×2) is used. Because the scanning operations of the upper and lower portions of the liquid crystal display panel 10 are simultaneously performed in the direction facing each other, the gate scanning time decreases. Hence, the response time of the liquid crystals LC when the two-way scanning operation is performed is shorter than the response time of the liquid crystals LC when the one-way scanning operation is performed. The turn-on time of the light sources is determined based on one of a saturated time of the liquid crystals LC in the middle portion of the first display surface 110A and a saturated time of the liquid crystals LC in the middle portion of the second display surface 110B. The saturated time of the liquid crystals LC in the middle portion of the first display surface 110A and the saturated time of the liquid crystals LC in the middle portion of the second display surface 110B are equal to each other because of the two-way scanning operation performed in the direction facing each other.

As a result, the liquid crystals LC at each position of the liquid crystal display panel 10 are saturated from immediately after the left eye data DATA(L) is written during the odd-numbered frame period to before the lapse of time corresponding to the first sub-frame period SF1. The liquid crystals LC are then kept in a saturation state during a period of time corresponding to the second sub-frame period SF2. The light sources BL are simultaneously turned on at the duty ratio equal to or less than 50% during a period of time of the odd-numbered frame period when all of the liquid crystals LC at each position are kept in the saturation state. For example, the light sources BL at each position are simultaneously turned on within a second half period of the second sub-frame period SF2. For example, the second half period of the second sub-frame period SF2 is 1/480 second when the unit frame period is 1/120 second. During the odd-numbered frame period, the left eye shutter is open, and the right eye shutter is closed.

Further, the liquid crystals LC at each position of the liquid crystal display panel 10 are saturated from immediately after the right eye data DATA(R) is written during the even-numbered frame period to before the lapse of time corresponding to the first sub-frame period SF1. The liquid crystals LC are then kept in a saturation state during a period of time corresponding to the second sub-frame period SF2. The light sources BL are simultaneously turned on at the duty ratio equal to or less than 50% during a period of time of the even-numbered frame period when all of the liquid crystals LC at each position are kept in the saturation state. For example, the light sources BL at each position are simultaneously turned on within a second half period of the second sub-frame period SF2. For example, the second half period of the second sub-frame period SF2 is 1/480 second when the unit frame period is 1/120 second. During the even-numbered frame period, the right eye shutter is open, and the left eye shutter is closed.

As shown in FIG. 5, the turn-on time of the light sources BL may vary depending on the maximum duty ratio of the PWM signal. As shown in FIG. 6, the level of the driving current applied to the light sources BL may be previously determined to be inversely proportional to the maximum duty ratio of the PWM signal.

As described above, the 3D image display device according to the embodiment of the invention controls the operations of the driving circuits using the frame frequency higher than the input frame frequency, divides the unit frame period into the first and second sub-frame periods, and repeatedly displays the same data during the first and second sub-frame periods of each unit frame period, thereby saturating all of the liquid crystals at each position of the liquid crystal display panel from immediately after the data is written during the unit frame period to before the lapse of time corresponding to the first sub-frame period. When the liquid crystals at each position are kept in a saturation state during a period of time corresponding to the second sub-frame period, the 3D image display device sequentially turns on the light sources at the duty ratio equal to or less than 50%. The 3D image display device alternately opens and closes the left and right shutters every unit frame period. Further, the 3D image display device increases the level of the driving current so as to compensate for the luminance reduction of the display surface resulting from the scanning drive. Hence, because the response time of the liquid crystals decreases, 3D crosstalk is prevented and the MPRT performance is greatly improved without the luminance reduction in a motion picture. As a result, the display quality of the 3D image display device is greatly improved.

Furthermore, the 3D image display device according to the embodiment of the invention controls the operations of the driving circuits using the frame frequency higher than the input frame frequency, simultaneously performs the scanning operation on the upper and lower portions of the display surface in the direction facing each other, writes the data in synchronization with the two-way scanning operation, divides the unit frame period into the first and second sub-frame periods, and repeatedly displays the same data during the first and second sub-frame periods of each unit frame period, thereby saturating all of the liquid crystals LC at each position of the liquid crystal display panel from immediately after the data is written during the unit frame period to before the lapse of time corresponding to the first sub-frame period. Further, the 3D image display device turns off all of the light sources during the first sub-frame period, turns on all of the light sources during the second sub-frame period, and alternately opens and closes the left and right shutters every unit frame period. The 3D image display device increases the level of the driving current so as to compensate for the luminance reduction of the display surface resulting from the blinking drive. Hence, because the response time of the liquid crystals decreases, the 3D crosstalk is prevented and the MPRT performance is greatly improved without the luminance reduction in the motion picture. As a result, the display quality of the 3D image display device is greatly improved.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:
1. A three-dimensional (3D) image display device comprising:
   a liquid crystal display panel configured to alternately display a left eye image and a right eye image every unit frame period, the liquid crystal display panel being divided into first and second display surfaces;
   a first data driving circuit configured to drive first data lines of the first display surface;

a second data driving circuit configured to drive second data lines of the second display surface;

a gate driving circuit configured to sequentially supply a gate pulse for scanning the first display surface to first gate lines of the first display surface and sequentially supply a gate pulse for scanning the second display surface to second gate lines of the second display surface, wherein a scanning operation of the first display surface and a scanning operation of the second display surface are simultaneously performed;

a timing controller configured to divide the unit frame period into first and second sub-frame periods, supply same frame data at least two times to each of the first and second data driving circuits during the unit frame period such that the same frame data is again supplied during the second sub-frame period of the unit frame period after the same frame data is supplied during the first sub-frame period of the unit frame period, and control operations of the first and second data driving circuits and the gate driving circuit using a frame frequency higher than an input frame frequency;

backlight light sources configured to generate light to be provided to the liquid crystal display panel; and a light source driving circuit configured to simultaneously turn off all the backlight light sources for both the first and second display surfaces during the first sub-frame period and simultaneously turn on all the backlight light sources for both the first and second display surfaces during a second half period of the second sub-frame period for less than the second sub-frame period and after liquid crystals in a middle portion of the first display surface along a vertical direction or liquid crystals in a middle portion of the second display surface along the vertical direction are kept in a saturation state, wherein a turning-on time of the backlight light sources within the second sub-frame period is determined based on one of a saturated time of liquid crystals in the middle portion of the first display surface and a saturated time of the liquid crystals in the middle portion of the second display surface, wherein the same frame data is at least two times supplied to the liquid crystal display panel during the unit frame period such that the same frame data is again supplied to the liquid crystal display panel during the second sub-frame period of the unit frame period after the same frame data is supplied to the liquid crystal display panel during the first sub-frame period of the unit frame period.

2. The 3D image display device of claim 1, wherein the scanning operation of the first display surface and the scanning operation of the second display surface are simultaneously performed in a direction facing each other.

3. The 3D image display device of claim 1, wherein the timing controller controls the operations of the first and second data driving circuits and the gate driving circuit using a frame frequency of (input frame frequency×N), where N is a positive integer equal to or greater than 2.

4. The 3D image display device of claim 1, further comprising a light source control circuit configured to generate a pulse width modulation (PWM) signal for controlling a turn-on operation and a turn-off operation of the backlight light sources and control a driving current applied to the backlight light sources.

5. The 3D image display device of claim 4, wherein a maximum duty ratio of the PWM signal is set within a range equal to or less than 50%.

6. The 3D image display device of claim 4, wherein a level of the driving current is set to be inversely proportional to the maximum duty ratio of the PWM signal.

7. The 3D image display device of claim 1, further comprising shutter glasses including a left eye shutter and a right eye shutter, the left eye shutter being opened during the unit frame period in which the left eye image is displayed, the right eye shutter being opened during the unit frame period in which the right eye image is displayed.

8. A method for driving a three-dimensional (3D) image display device, the device comprising a liquid crystal display panel for alternately displaying a left eye image and a right eye image every unit frame period, the liquid crystal display panel being divided into first and second display surfaces, a data driving circuit for supplying data voltages to the liquid crystal display panel, a gate driving circuit for supplying gate pulses to the liquid crystal display panel, a timing controller for controlling operations for the data driving circuit and the gate driving circuit using a frame frequency higher than an input frame frequency, backlight light sources for providing light to the liquid crystal display panel, a light source driving circuit for controlling the backlight light sources and a shutter control circuit for controlling shutter glasses, the method comprising:

simultaneously performing a scanning operation of the first display surface and a scanning operation of the second display surface, the scanning operation of the first display surface including sequentially supplying a gate pulse for scanning the first display surface to first gate lines of the first display surface, the scanning operation of the second display surface including sequentially supplying a gate pulse for scanning the second display surface to second gate lines of the second display surface;

supplying same frame data at least two times to each of a first and second data driving circuits during the unit frame period such that the same frame data is again supplied during the second sub-frame period of the unit frame period after the same frame data is supplied during the first sub-frame period of the unit frame period, the unit frame period being divided into the first and second sub-frame periods; and simultaneously turning off all the backlight light sources for both the first and second display surfaces during the first sub-frame period and simultaneously turning on all the backlight light sources for both the first and second display surfaces during a second half period of the second sub-frame period for less than the second sub-frame period and after liquid crystals in a middle portion of the first display surface along a vertical direction or liquid crystals in a middle portion of the second display surface along the vertical direction are kept in a saturation state.

9. The method of claim 8, wherein the scanning operation of the first display surface and the scanning operation of the second display surface are simultaneously performed in a direction facing each other.

10. The method of claim 8, wherein the operations for the data driving circuit and the gate driving circuit are controlled based on a frame frequency of (input frame frequency×N), where N is a positive integer equal to or greater than 2.

11. The method of claim 8, further comprising:
generating a pulse width modulation (PWM) signal for controlling a turn-on operation and a turn-off operation of the backlight light sources and controlling a driving current applied to the backlight light sources.

12. The method of claim 11, wherein a maximum duty ratio of the PWM signal is set within a range equal to or less than 50%.

13. The method of claim 11, wherein a level of the driving current is set to be inversely proportional to the maximum duty ratio of the PWM signal.

14. The method of claim 8, further comprising:
generating a left eye shutter control signal for opening a left eye shutter of the shutter glasses during the unit frame period in which the left eye image is displayed and generating a right eye shutter control signal for opening a right eye shutter of the shutter glasses during the unit frame period in which the right eye image is displayed.

* * * * *